United States Patent
Dsouza et al.

(10) Patent No.: US 10,776,102 B1
(45) Date of Patent: Sep. 15, 2020

(54) SECURING FIRMWARE INSTALLATION ON USB INPUT DEVICE

(71) Applicant: Microsoft Technology Licensing, LLC, Redmond, WA (US)

(72) Inventors: Vivian Dsouza, Bothell, WA (US); Raymond Kok Yoong Chow, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/409,597

(22) Filed: May 10, 2019

(51) Int. Cl.
*G06F 9/44* (2018.01)
*G06F 8/65* (2018.01)
(Continued)

(52) U.S. Cl.
CPC ............... *G06F 8/65* (2013.01); *G06F 21/32* (2013.01); *G06F 21/34* (2013.01); *G06F 21/35* (2013.01); *G06F 21/44* (2013.01); *G06F 21/53* (2013.01); *G06F 21/57* (2013.01); *G06F 21/78* (2013.01); *G06F 13/4282* (2013.01); *H04L 9/3234* (2013.01)

(58) Field of Classification Search
CPC ...... G06F 21/53; G06F 21/35; G06F 13/4282; G06F 21/78; G06F 21/34; G06F 21/44; G06F 21/57; G06Q 50/24; H04L 9/3234
See application file for complete search history.

(56) References Cited

U.S. PATENT DOCUMENTS

| 7,126,629 B1 | 10/2006 | Braunstein et al. |
| 8,890,925 B2 | 11/2014 | Weiser et al. |

(Continued)

FOREIGN PATENT DOCUMENTS

| CN | 103051834 A | 4/2013 |
| WO | 2009062965 A2 | 5/2009 |
| WO | 2017074628 A1 | 5/2017 |

OTHER PUBLICATIONS

Golden, Barry, "Device firmware update for USB devices without using a co-installer", Retrieved From https://docs.microsoft.com/en-us/windows-hardware/drivers/stream/device-firmware-update-for-usb-devices-without-using-a-co-installer, Nov. 15, 2018, 8 Pages.

(Continued)

*Primary Examiner* — Tuan A Vu
(74) *Attorney, Agent, or Firm* — Alleman Hall Creasman & Tuttle LLP (57) ABSTRACT

One example provides, on a USB input device, a method comprising receiving an unlock request to change a firmware lock state of a controller of the USB input device from a locked state to an unlocked state, determining whether the unlock request is valid or invalid, when the unlock request is valid, updating the firmware lock state from the locked state to the unlocked state and sending a process completion message, when the unlock request is invalid, sending the process completion message without updating the firmware lock state, receiving a firmware update request, determining whether the firmware lock state is in the locked state or the unlocked state, receiving a firmware payload, authenticating data of the firmware payload, and when the firmware lock state is determined to be in the unlocked state and when the data of the firmware payload is authenticated, then installing the firmware payload.

20 Claims, 6 Drawing Sheets

(51) Int. Cl.
*G06F 21/44* (2013.01)
*G06F 21/34* (2013.01)
*G06F 21/32* (2013.01)
*G06F 21/78* (2013.01)
*G06F 21/53* (2013.01)
*G06F 21/57* (2013.01)
*G06F 21/35* (2013.01)
*H04L 9/32* (2006.01)
*G06F 13/42* (2006.01)

(56) References Cited

U.S. PATENT DOCUMENTS

| | | | |
|---|---|---|---|
| 8,988,532 | B2 | 3/2015 | Soffer |
| 9,292,103 | B2 | 3/2016 | Burr |
| 9,769,123 | B2 | 9/2017 | Grewal et al. |
| 2006/0143600 | A1 | 6/2006 | Cottrell et al. |
| 2007/0083939 | A1* | 4/2007 | Fruhauf .................. G06F 21/78 726/34 |
| 2007/0214369 | A1* | 9/2007 | Roberts .................. G06Q 50/24 713/192 |
| 2012/0072734 | A1 | 3/2012 | Wishman et al. |
| 2014/0259153 | A1* | 9/2014 | Le ........................... G06F 21/78 726/19 |
| 2016/0275036 | A1* | 9/2016 | Chew .................. G06F 13/4282 |
| 2018/0357406 | A1* | 12/2018 | Bolotin .................. G06F 21/35 |
| 2019/0042805 | A1* | 2/2019 | Desai ..................... G06F 21/53 |

OTHER PUBLICATIONS

Golden, Barry, "USB Video Class Extension Units", Retrieved From https://docs.microsoft.com/en-us/windows-hardware/drivers/stream/usb-video-class-extension-units, Apr. 20, 2017, 1 Page.

"International Search Report and Written Opinion Issued in PCT Application No. PCT/US2020/028165", dated Jun. 24, 2020, 11 Pages.

* cited by examiner

SECURING FIRMWARE INSTALLATION ON USB INPUT DEVICE

BACKGROUND

A computing device may include one or more Universal Serial Bus (USB) input devices. For example, a laptop computer may have a camera in a lid portion and a motherboard within a main body. Extending mobile industry processor interface (MIPI) trace lines from the motherboard to the camera may be infeasible, e.g. due to the length of the trace lines or the hinge coupling. Thus, a USB camera may be used to facilitate connecting the camera to the motherboard.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to securing a firmware installation/update process on a USB input device. One disclosed example provides a method comprising receiving, from a host computing system, an unlock request to change a firmware lock state of a controller of the USB input device from a locked state to an unlocked state, and determining whether the unlock request is valid or invalid. When the unlock request is valid, the method comprises updating the firmware lock state from the locked state to the unlocked state and sending a process completion message to the host computing system. When the unlock request is invalid, the method comprises sending the process completion message to the host computing system without updating the firmware lock state. The method also comprises receiving, from the host computing system, a firmware update request, determining whether the firmware lock state is in the locked state or the unlocked state, receiving, from the host computing system, a firmware payload, authenticating the firmware payload, and when the firmware lock state is determined to be in the unlocked state and when the firmware payload is authenticated, then installing the firmware payload.

DETAILED DESCRIPTION

Some USB input devices may accept and install a firmware update without performing a security protocol to verify/authenticate the firmware update. This may be acceptable for USB input devices with limited performance and feature capabilities. However, some USB input devices, such as cameras, microphone arrays, and touch sensors, may be used for biometric user authentication via methods such as facial recognition, voice recognition/commands, and/or fingerprint detection. Where the firmware of such input devices is not secured, the input device may be vulnerable to the installation of malicious firmware to access data input via such USB input devices. For example, malicious firmware code may be used to access IR video frames obtained by an IR camera, or voice samples acquired by a microphone. Further, USB input device manufacturers may provide unsecure tools that may be downloaded on public networks for performing firmware updates, thus facilitating such malicious firmware installation.

One potential solution that may help prevent unauthorized firmware updates on a USB input device involves modifying hardware of the USB input device and/or a computing device with which the USB input device is integrated. For example, a dedicated general-purpose input output (GPIO) pin of a central processing unit (CPU) of the computing device may be allocated for connecting to the USB input device. The dedicated GPIO pin may be toggled to lock the Serial Peripheral Interface (SPI) flash, and may thereby disable in-field firmware updates for the controller of the USB input device. However, this design-level hardware change requires an available GPIO pin for a specific processor. Further, implementing this hardware-level change involves a firmware change to the basic input/output system (BIOS) code, as well as additional security around the pin control logic, e.g. such that an end user is unable to toggle the GPIO pin. When different product lines utilize a same USB device but different central processing devices, the same GPIO pin may not be compatible with each processing device. Further, each SoC may write BIOS code in a different manner, resulting in deploying different variants of firmware for each type of processing device. Such changes may increase design and manufacturing costs of a computing device.

Thus, examples are disclosed that relate to securing a firmware installation/update process using techniques that are not specific to the processing hardware of a computing device with which the USB input device is integrated. Briefly, a USB input device controller comprises firmware that includes a lock/unlock state. When the firmware is to be updated (e.g. during manufacturing), the controller receives a lock/unlock request from a host, determines a validity of a lock/unlock request, and updates its firmware lock state—a state indicative of being able or unable to modify firmware code—when the lock/unlock request is determined to be valid. When a firmware update request is received, the USB input device controller verifies its current lock state to determine whether the USB input device controller is in an unlocked state and thus able to accept a firmware update. Further, the USB input device controller verifies/authenticates data that accompanies a firmware payload, to determine whether to write the firmware payload. This may help to prevent accidental or malicious firmware payloads from being installed on a controller of a USB input device, which may help to increase the security of a USB input device used for biometric data sensing. Further, by implementing a firmware/software solution for a controller of a USB input device, the disclosed examples are not dependent upon any specific hardware configuration, and do not entail supporting the UEFI capsule framework and BIOS customization overhead associated with controlling GPIOs on a particular platform.

Figure 1:
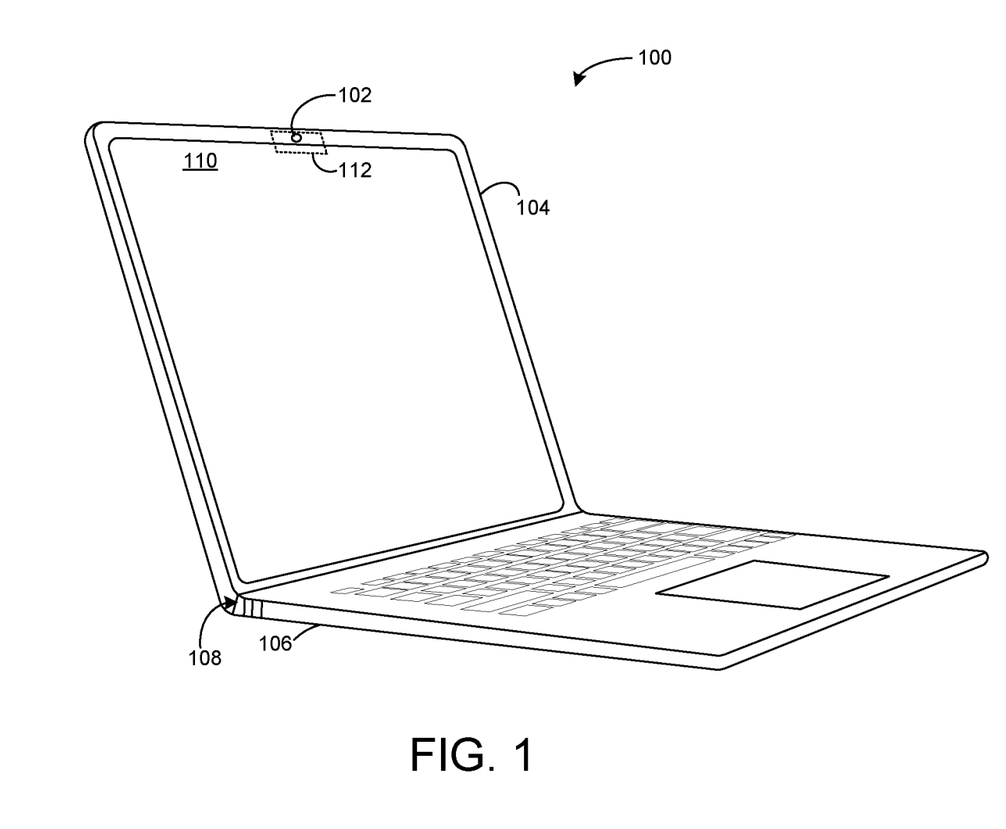
FIG. 1 depicts an example computing device comprising a Universal Serial Bus (USB) input device.

Prior to discussing these examples, FIG. 1 depicts an example computing device 100 in the form of a laptop computer having a camera 102. The computing device 100 comprises a lid 104 coupled to a main body 106 of the computing device 100 via a hinge 108 or other rotatable/flexible connection. In this configuration, a motherboard of the computing device 100 may reside inside the main body 106, whereas the camera 102 resides in the lid 104 above a display 110. Extending mobile industry processor interface (MIPI) trace lines from the motherboard in the main body 106 to the camera 102 may be infeasible, e.g. due to the length of the trace lines or the hinge coupling. Thus, the camera 102 may take the form of a USB camera that comprises a controller 112 connected to the computing device 100 via a USB connection.

While described as a USB camera 102 in this example, the security examples described herein may be used with any suitable sensor/input device. Examples include image sensors (RGB, IR, depth), touch sensors, and audio sensors (microphones, microphone arrays). Further, while depicted as a laptop computer in FIG. 1, any other suitable computing device may be used in other examples. Examples of computing devices include mobile computing devices (tablets, head-mounted devices, smartphones), desktop computing devices, display devices with integrated USB sensors (e.g. monitors, televisions), medical devices, etc.

Controller 112 may represent any suitable type of controller. In some examples, the type of controller used may depend upon the type of sensor(s) to which the controller 112 is coupled. Examples of controller 112 include microcontrollers (MCUs), digital signal processors (DSPs), and image signal processors (ISPs).

Figure 2:
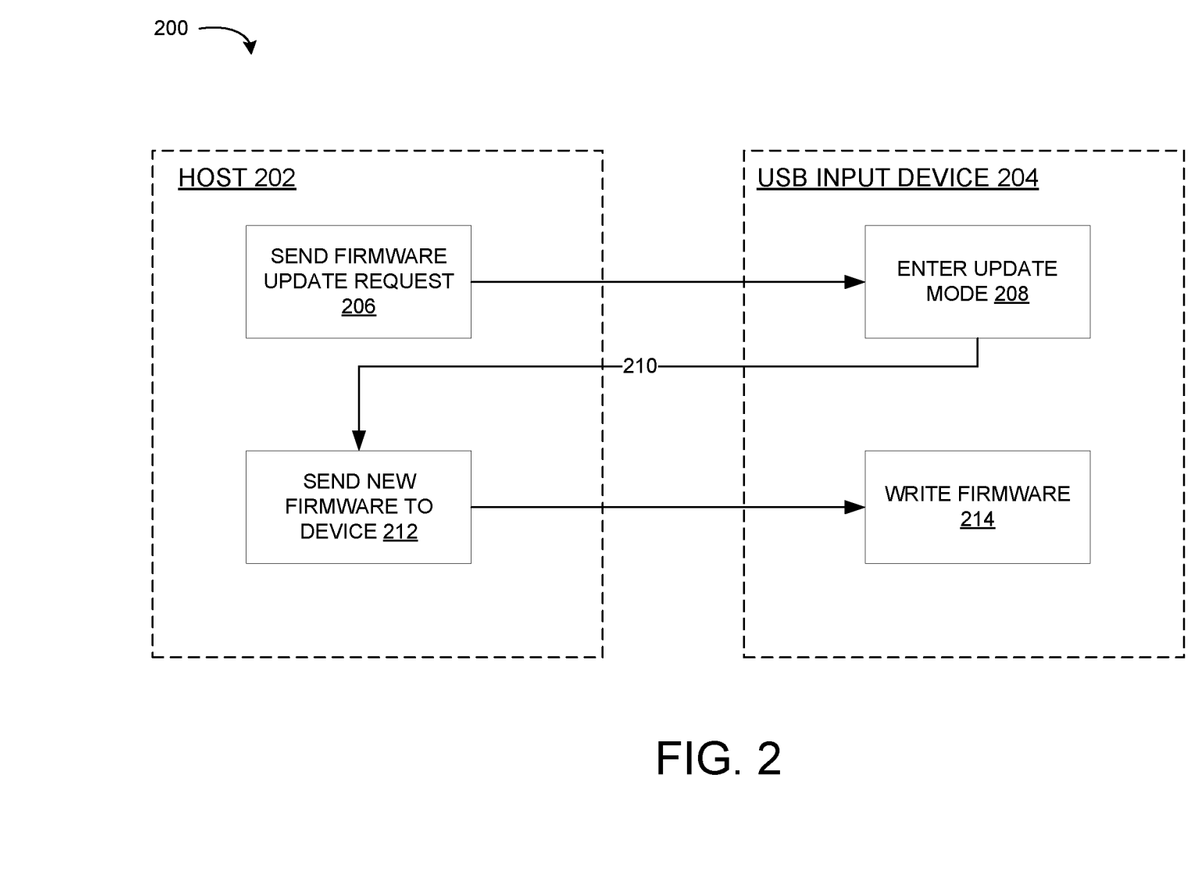
FIG. 2 is a flow diagram illustrating a method of installing firmware on a USB input device without a lock state.

When manufacturing the computing device 100, a manufacturer may use a software tool provided by the USB input device manufacturer to install/update firmware on the USB device. FIG. 2 depicts a method 200 of installing/updating firmware using such a firmware update tool. Method 200 may be implemented as stored instructions executable by logic residing on a host 202 and on a USB input device 204. In some instances, the host 202 comprises a computing system local to a manufacturing vendor site (e.g. a PC, a server computer, and/or another computing system). In other examples, the host 202 may comprise the computing device (e.g. computing device 100 in FIG. 1) with which the USB input device is integrated.

At 206, the host 202 sends a firmware update request to the USB input device 204. In response, the USB input device 204 enters an update mode, as indicated at 208. The USB input device 204 may optionally send a message to the host 202 indicating that the USB input device 204 is in the update mode and ready to receive a firmware update, as indicated by arrow 210. At 212, the host 202 begins the firmware installation process by sending new firmware code to the USB input device 204. The USB input device 204 writes the firmware code received, as indicated at 214.

In method 200, the USB input device 204 automatically accepts the firmware update request received from the host 202, and writes the firmware code received, without determining whether the update request and/or the firmware code are valid. In this manner, the USB input device 204 may automatically accept and write a malicious/corrupt firmware binary.

Figure 3:
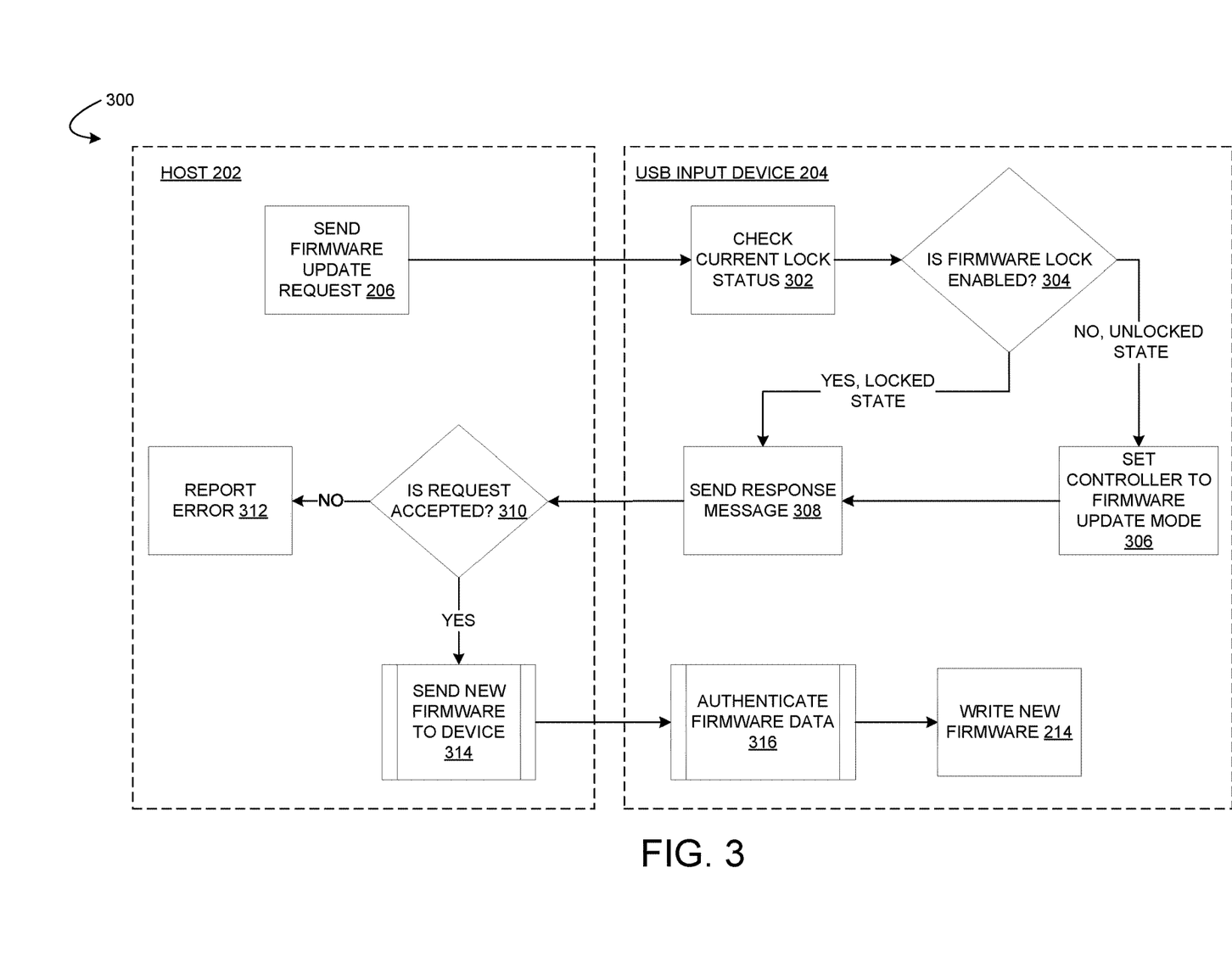
FIG. 3 is a flow diagram illustrating an example method of installing firmware on a secured USB input device.

Thus, FIG. 3 is a flow diagram illustrating an example of a more secure method 300 of installing/updating firmware.

As indicated by the dashed lines surrounding the host 202 and the USB input device 204 in FIG. 3, aspects of method 300 may be implemented as stored instructions executable by logic residing on the host 202 and as stored instructions executable by logic residing on the USB input device 204. In some instances, the USB input device 204 may leverage capabilities of an existing extension unit (XU) framework to implement the security protocols described herein. In a more specific example, when the USB input device 204 comprises a USB camera, an extension to the USB Video Class specification, such as MS_CAMERA_CONTROL_XU available from Microsoft Corp. of Redmond, Wash., may be used to implement aspects of method 300. In other examples, rather than leveraging capabilities of an XU, a USB input device may include any other suitable identifier built into the firmware of its controller, and a host-side tool may use that identifier to communicate with the firmware of the controller.

Similar to method 200, method 300 begins at 206, where the host 202 sends a firmware update request to the USB input device 204. A vendor-provided software tool may be used to perform step 206, but the USB input device does not automatically enter a firmware update mode upon receiving the firmware update request. Rather than automatically entering the firmware update mode, the USB input device 204 determines whether its controller is able to receive a firmware update by checking, at 302, its current firmware lock state. In some examples, the USB input device 204 utilizes a state machine, and a lock variable configured within non-volatile memory at a predetermined offset is indicative of the current firmware lock state of the USB input device 204. In other examples, a lock variable may be stored in volatile memory and thus may be valid only until a device shutdown.

At 304, the USB input device 204 determines whether the firmware lock is enabled or not enabled. If firmware lock is not enabled (in unlocked state), then method 300 proceeds to 306, where the controller of the USB input device 204 is set to a firmware update mode. Method 300 then proceeds to 308, where the USB input device 204 sends a response message to the host 202. If firmware lock is enabled (in locked state), then process 300 proceeds to 308, without setting the USB input device 204 to a firmware update mode. In some examples, the response message may take the form of a "process completion" message that indicates, to the host 202, that the firmware update request was received and acknowledged by the USB input device 204 but does not necessarily indicate an outcome of the firmware update request. In other examples, the USB input device 204 may send information indicating whether the firmware update request is accepted or rejected, and/or whether the firmware is in a locked state or unlocked state, with the process completion message. In some examples, the response message may be abstract in that it is interpretable by an expected host 202 but not interpretable by other users/devices.

At 310, the host 202 may optionally determine whether the firmware update request was accepted by the USB input device 204, e.g. based upon whether the response message received included such information. When the host 202 determines that the request is not accepted, the host 202 may report an error, as indicated at 312. When the host 202 determines that the request was accepted, or when the host does not perform the determination step 310, method 300 may proceed to 314. At 314, the host 202 sends, to the USB input device 204, a payload comprising new firmware.

At 316, the USB input device 204 authenticates firmware data of the payload received. When the controller is in the locked state and/or when the firmware data cannot be authenticated, the device 204 does not write the new firmware. When the controller is in the unlocked state and the firmware data is authenticated, the device 204 writes the new firmware, as indicated at 214.

Method 300 may be used in a secured manufacturing environment to securely install/update firmware on a controller of a USB input device during assembly of a computing device comprising a USB input device. Method 300 also may be used to securely perform in-field firmware updates, where a device manufacturer enables such in-field updates.

Figure 4:
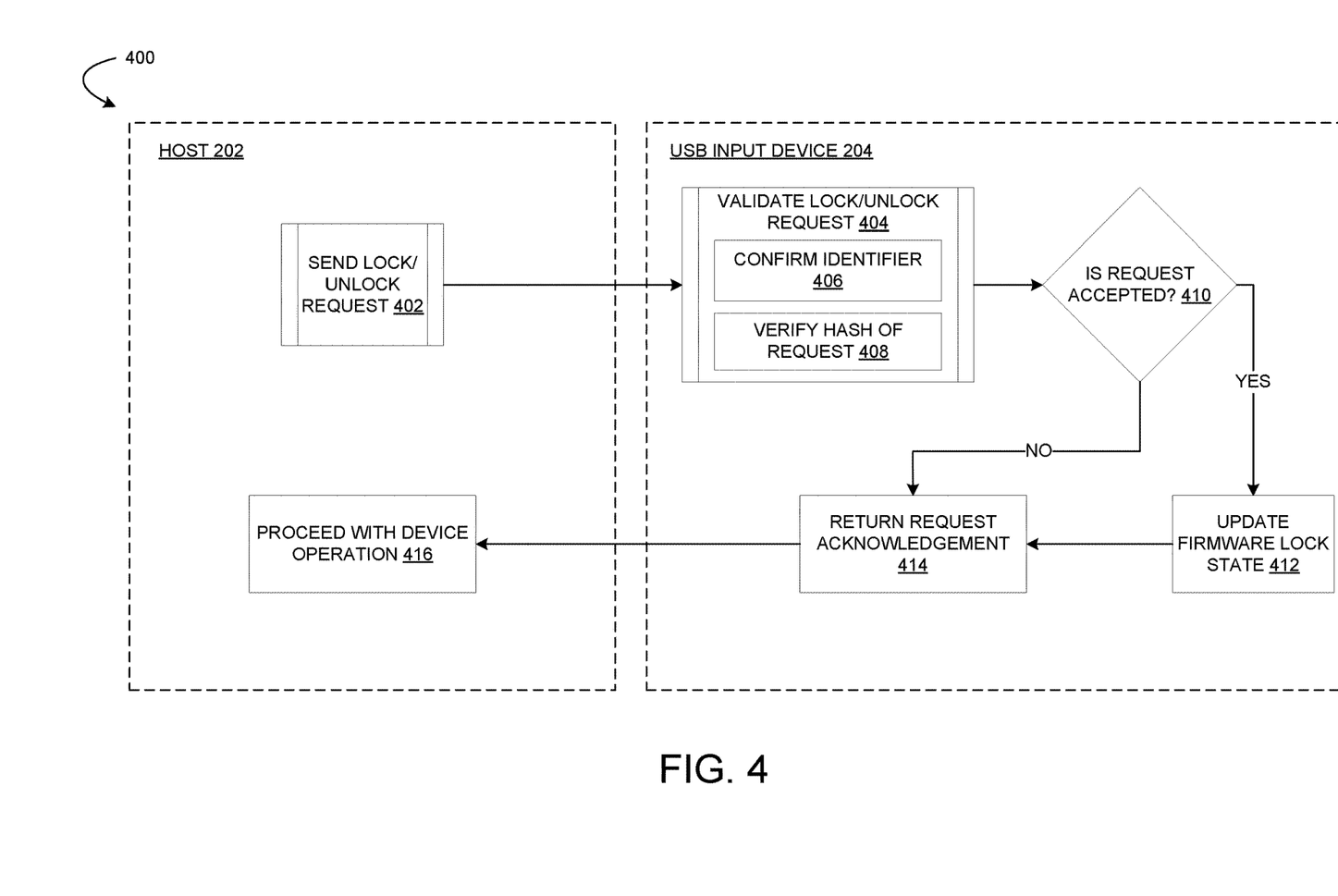
FIG. 4 is a flow diagram illustrating an example lock/unlock process for changing a lock state of a secured USB input device.

FIG. 4 depicts an example lock/unlock method 400 usable to change a lock state of the USB input device 204 prior to sending a firmware update request (e.g. step 206 in FIG. 3). Method 400 may be used, for example, during development and testing stages, or during manufacturing, to upgrade or downgrade firmware on a controller to a different version of the firmware. In some instances, when the firmware is production-ready (e.g. no further upgrades/downgrades), the firmware lock state may be set to a default locked state to disable in-field firmware updates. Aspects of method 400 may be implemented via a lock/unlock software tool private to a developer or a manufacturer of a computing device with which a USB input device is integrated.

At 402, the host 202 sends a lock/unlock request to the USB input device 204 using a lock/unlock tool that is private and inaccessible by devices/users other than an authorized host 202. The lock/unlock request may comprise a payload that includes, for example, an identifier of a custom control XU that is private to the manufacturer and/or designer, and a checksum that the firmware can verify.

When the ISP firmware receives the XU request, it validates the request at 404. For example, the lock/unlock request may be encrypted via a key specific to a particular firmware version on the controller (such that key1 corresponds to version1 of the firmware, key2 corresponds to version2, etc.). The USB input device 204 may decrypt the request via a key baked into the firmware of its controller based upon the particular firmware version installed. Once the lock/unlock request is decrypted, the custom control XU identifier (or other suitable identifier) may be validated at 406. Further, a hash of lock/unlock request may be computed and compared to an expected hash, as indicated at 408.

At 410, the USB input device 204 determines whether to accept the lock/unlock request. When the USB input device 204 confirms that the identifier received matches the expected identifier, and the hash check succeeds, then the firmware lock state is updated from the locked state to the unlocked state at 412. In some examples, the USB input device 204 stores a lock variable in internal non-volatile memory of the USB input device 204. In other examples, the USB input device 204 may store the lock variable in a volatile memory location, such as random-access memory (RAM), such that the lock variable is only valid until a device reset.

After updating the lock state, method 400 proceeds to 414, where the USB input device 204 returns a request acknowledgement to the host 202. Likewise, when the identifier received does not match an expected identifier, and/or when the hash verification fails, method 400 proceeds to 414 without updating the lock state.

In some examples, the request acknowledgement sent at 414 may not include an indication as to whether the lock/unlock request was accepted by the USB input device 204, which may help to obfuscate (e.g. to a hacker/malicious actor) whether the lock/unlock request validation failed. In other examples, the USB input device 204 may send information indicating success or failure of the lock/unlock request with the request acknowledgement. The information may include a pass/fail indication, and/or may indicate the current lock state. At 416, the host proceeds with device operations, for example, by sending a firmware update request to the USB input device 204, as described above with reference to method 300.

Figure 5:
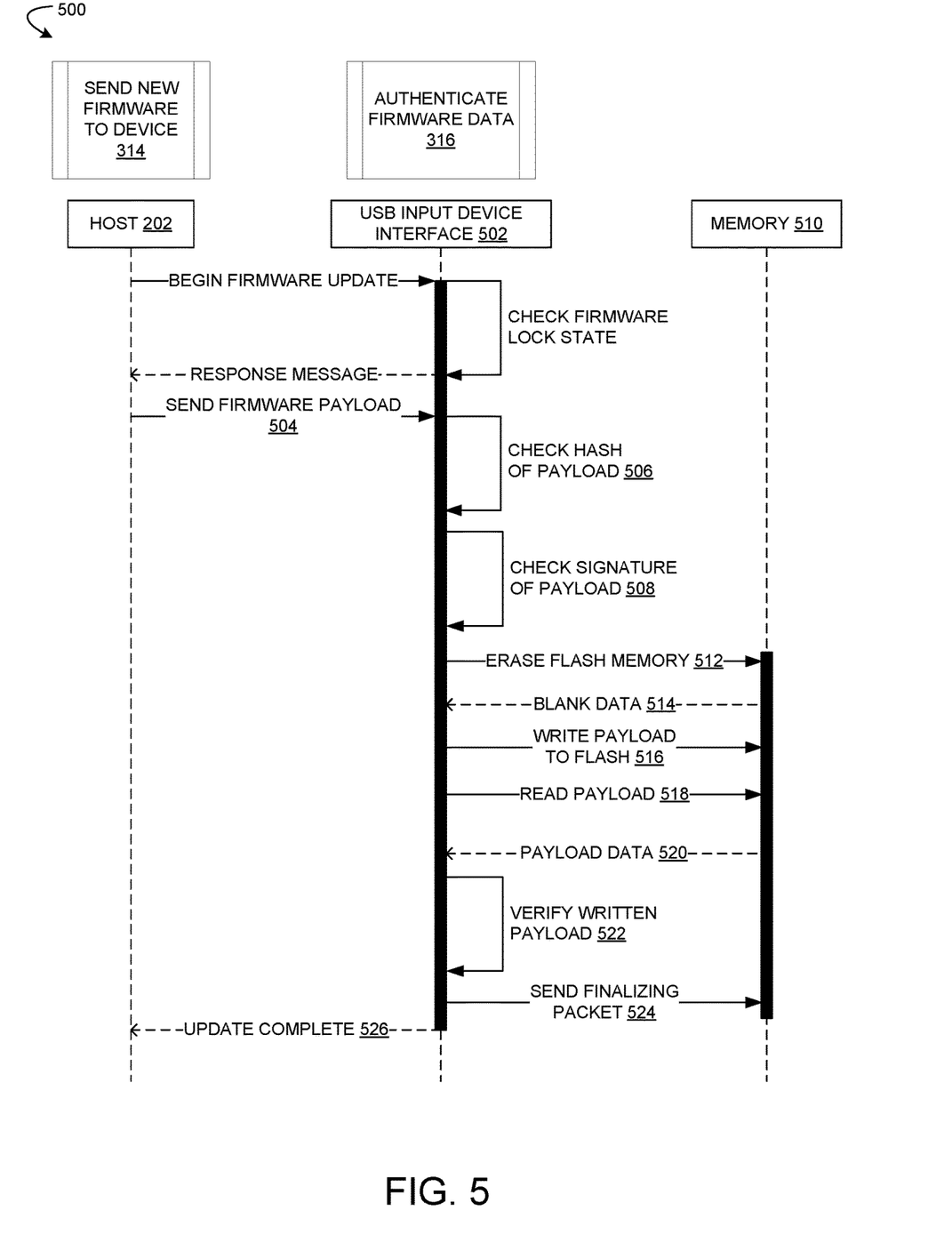
FIG. 5 depicts an example command sequence which may be used to enact aspects of the example method of FIG. 3.

FIG. 5 depicts an example command sequence 500 between the host 202 and a USB input device interface 502 that is usable to send new firmware to the USB input device (step 314 in FIG. 3), authenticate firmware data (step 316 in FIG. 3), and optionally write the new firmware (step 214 in FIG. 3).

As mentioned above, the host 202 initiates a firmware update by sending a firmware update request (e.g. a "begin firmware update" USB command), to the USB input device. The USB input device receives this request and checks its current lock state to determine whether firmware lock is enabled or disabled, e.g. based on a state of a lock variable stored in memory. After determining whether the current lock state is in the unlocked state or the locked state, the USB input device sends a response message to the host 202.

After receiving the response message, the host 202 deploys new firmware by sending a firmware payload to the device interface 502, as indicated at 504. In some examples, the firmware payload may take the form of a signed binary blob. As indicated at 506, the USB input device authenticates data of the firmware payload by decrypting the firmware payload, generating a hash of the firmware payload, and comparing the hash to an expected hash, for example, by matching a checksum of the generated hash to the checksum of the expected hash. In addition to verifying a hash of the firmware payload, the USB input device verifies whether the signature of the firmware payload matches an expected/authorized signature, as indicated at 508. In some instances, the USB input device expects the firmware payload to be signed with a trusted root certificate or other private signature accessible by only an authorized/trusted host.

Once the firmware payload is authenticated, the device writes the firmware payload to memory 510. As one example, the USB input device interface 502 sends a command to erase flash memory (512), receives a confirmation of blank data (514), writes the firmware payload to the flash memory (516), sends a read request to read the firmware payload (518), receives payload data from the memory 510 (520), verifies the written payload (522), and sends a finalizing packet (524) to the memory 510.

The firmware payload written to memory comprises the lock variable in a locked state. Thus, the writing of the updated firmware to the USB device re-locks the USB device. This prevents any further updates to the firmware of the USB input device until another lock/unlock request is successfully performed. Further, the firmware payload supplies the USB input device with a new key usable to unlock the firmware lock state of the new/current firmware version, as the key usable to unlock the prior version of the firmware (prior to writing the new firmware payload) may not be used to unlock the new/current version of the firmware.

The examples described herein provide multiple layers of security for firmware installation/update on a USB input device, and thereby may help to prevent the installation of malicious firmware on such a device.

In some embodiments, the methods and processes described herein may be tied to a computing system of one or more computing devices. In particular, such methods and processes may be implemented as a computer-application program or service, an application-programming interface (API), a library, and/or other computer-program product.

Figure 6:
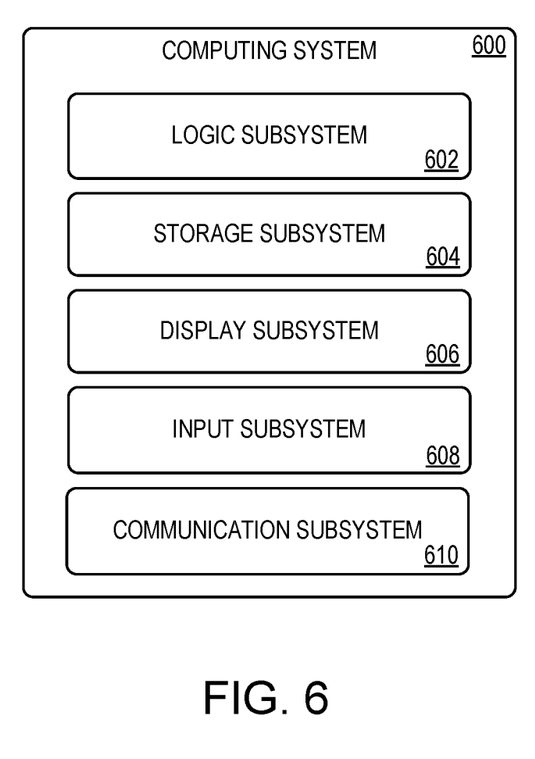
FIG. 6 is a block diagram illustrating an example computing system.

FIG. 6 schematically shows a non-limiting embodiment of a computing system 600 that can enact one or more of the methods and processes described above. Computing system 600 is shown in simplified form. Computing system 600 may take the form of one or more personal computers, server computers, tablet computers, home-entertainment computers, network computing devices, gaming devices, mobile computing devices, mobile communication devices (e.g., smart phone), and/or other computing devices.

Computing system 600 includes a logic machine 602 and a storage machine 604. Computing system 600 may optionally include a display subsystem 606, input subsystem 608, communication subsystem 610, and/or other components not shown in FIG. 6.

Logic machine 602 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine 602 may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 604 includes one or more physical devices configured to hold instructions executable by the logic machine to implement the methods and processes described herein. When such methods and processes are implemented, the state of storage machine 604 may be transformed—e.g., to hold different data.

Storage machine 604 may include removable and/or built-in devices. Storage machine 604 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 604 may include volatile, nonvolatile, dynamic, static, read/write, read-only, random-access, sequential-access, location-addressable, file-addressable, and/or content-addressable devices.

It will be appreciated that storage machine 604 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 602 and storage machine 604 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system 600 implemented to perform a particular function. In some cases, a program may be instantiated via logic machine 602 executing instructions held by storage machine 604. It will be understood that different programs may be instantiated from the same application, service, code block, object, library, routine, API, function, etc. Likewise, the same program may be instantiated by different applications, services, code blocks, objects, routines, APIs, functions, etc. The term "program" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 606 may be used to present a visual representation of data held by storage machine 604. This visual representation may take the form of a graphical user interface (GUI). As the herein described methods and processes change the data held by the storage machine, and thus transform the state of the storage machine, the state of display subsystem 606 may likewise be transformed to visually represent changes in the underlying data. Display subsystem 606 may include one or more display devices utilizing virtually any type of technology. Such display devices may be combined with logic machine 602 and/or storage machine 604 in a shared enclosure, or such display devices may be peripheral display devices.

When included, input subsystem 608 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 610 may be configured to communicatively couple computing system 600 with one or more other computing devices. Communication subsystem 610 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 600 to send and/or receive messages to and/or from other devices via a network such as the Internet.

Another example provides, on a Universal Serial Bus (USB) input device, a method comprising receiving, from a host computing system, an unlock request to change a firmware lock state of a controller of the USB input device from a locked state to an unlocked state, determining whether the unlock request is valid or invalid, when the unlock request is valid, updating the firmware lock state from the locked state to the unlocked state and sending a process completion message to the host computing system, when the unlock request is invalid, sending the process completion message to the host computing system without updating the firmware lock state, receiving, from the host computing system, a firmware update request, determining whether the firmware lock state is in the locked state or the unlocked state, receiving, from the host computing system, a firmware payload, authenticating data of the firmware payload, and when the firmware lock state is determined to be in the unlocked state, and when the data of the firmware payload is authenticated, then installing the firmware payload. In such an example, determining whether the unlock request is valid or invalid may additionally or alternatively comprise comparing an identifier of the unlock request to an expected identifier. In such an example, determining whether the unlock request is valid or invalid may additionally or alternatively comprise decrypting the unlock request and comparing a hash of the unlock request to an expected hash. In such an example, sending the process completion message to the host computing system may additionally or alternatively comprise sending information indicating the firmware lock state with the process completion message. In such an example, authenticating the data of the firmware payload may additionally or alternatively comprise verifying a hash of the firmware payload. In such an example, installing the firmware payload may additionally or alternatively comprise updating the firmware lock state to the locked state. In such an example, the method may additionally or alternatively comprise, after determining whether the firmware lock state is in the locked state or the unlocked state, sending a response message to the host computing system. In such an example, sending the response message may additionally or alternatively comprise, when the firmware lock state is determined to be in the locked state, sending a response message rejecting the firmware update request.

Another example provides a USB input device comprising a controller configured to receive, from a host computing system, an unlock request to change a firmware lock state from a locked state to an unlocked state, determine whether the unlock request is valid or invalid, when the unlock request is valid, update the firmware lock state from the locked state to the unlocked state and send a process completion message to the host computing system, when the unlock request is invalid, send the process completion message to the host computing system without updating the firmware lock state, receive, from the host computing system, a firmware update request, determine whether the firmware lock state is in the locked state or the unlocked state, receive, from the host computing system, a firmware payload, authenticate data of the firmware payload, and when the firmware lock state is determined to be in the unlocked state, and when the data of the firmware payload is authenticated, then install the firmware payload. In such an example, the USB input device may additionally or alternatively comprise a biometric input device. In such an example, the USB input device may additionally or alternatively be configured to, after determining whether the firmware lock state is in the locked state or the unlocked state, send a response message to the host computing system. In such an example, the USB input device may additionally or alternatively be configured to, when the firmware lock state is determined to be in the locked state, send, to the host computing system, a response message rejecting the firmware update request. In such an example, the USB input device may additionally or alternatively be configured to determine whether the unlock request is valid or invalid by comparing an identifier of the unlock request to an expected identifier. In such an example, the USB input device may additionally or alternatively be configured to determine whether the unlock request is valid or invalid by decrypting the unlock request and comparing a hash of the unlock request to an expected hash. In such an example, the USB input device may additionally or alternatively be configured to send the process completion message to the host computing system by sending information indicating the firmware lock state with the process completion message. In such an example, the USB input device may additionally or alternatively be configured to authenticate the data of the firmware payload by verifying a hash of the firmware payload. In such an example, the USB input device may additionally or alternatively be configured to, after installing the firmware payload, update the firmware lock state to the locked state. In such an example, the USB input device may additionally or alternatively be connected to a motherboard of a laptop computer via a USB connection.

Another example provides a method for installing firmware on a controller of a USB input device, the method comprising sending, to the controller, an unlock request for changing a firmware lock state of the controller from a locked state to an unlocked state, receiving, from the controller, a process completion message, sending, to the controller, a request to install the firmware on the controller, receiving, from the controller, a message responsive to the request to install the firmware, sending, to the controller, a firmware payload, when the unlock request and a verification of the firmware payload are successful, then receiving a confirmation of firmware installation, and when the unlock request is not successful and/or when the verification of the firmware payload is not successful, then receiving a message regarding a failure to complete the firmware installation. In such an example, sending the firmware payload may additionally or alternatively comprise sending a signed binary.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. On a Universal Serial Bus (USB) input device equipped with a controller having executable instructions stored thereon, a method executing instructions on the controller for securely updating firmware of the controller, comprising:
   receiving, from a host computing system coupled to the USB device for providing an update firmware thereto, an unlock request to change a firmware lock state of a controller of the USB input device from a locked state to an unlocked state;
   determining whether the unlock request is valid or invalid;

when the unlock request is valid, updating the firmware lock state from the locked state to the unlocked state and sending a process completion message to the host computing system;

when the unlock request is invalid, sending the process completion message to the host computing system without updating the firmware lock state;

receiving, from the host computing system, a firmware update request;

determining whether the firmware lock state is in the locked state or the unlocked state;

receiving, from the host computing system, a firmware payload;

authenticating data of the firmware payload; and when the firmware lock state is determined to be in the unlocked state, and when the data of the firmware payload is authenticated, installing the firmware payload.

2. The method of claim 1, wherein determining whether the unlock request is valid or invalid comprises comparing an identifier of the unlock request to an expected identifier.

3. The method of claim 1, wherein determining whether the unlock request is valid or invalid comprises decrypting the unlock request and comparing a hash of the unlock request to an expected hash.

4. The method of claim 1, wherein sending the process completion message to the host computing system comprises sending information indicating the firmware lock state with the process completion message.

5. The method of claim 1, wherein authenticating the data of the firmware payload comprises verifying a hash of the firmware payload.

6. The method of claim 1, wherein installing the firmware payload comprises updating the firmware lock state to the locked state.

7. The method of claim 1, further comprising, after determining whether the firmware lock state is in the locked state or the unlocked state, sending a response message to the host computing system.

8. The method of claim 7, wherein sending the response message comprises, when the firmware lock state is determined to be in the locked state, sending a response message rejecting the firmware update request.

9. A USB input device comprising a controller having stored thereon executable instructions which, when executed by the controller, implement execution for updating firmware of the controller, the execution configured to:

receive, from a host computing system coupled to the USB device for providing an update firmware thereto, an unlock request to change a firmware lock state from a locked state to an unlocked state;

determine whether the unlock request is valid or invalid;

when the unlock request is valid, update the firmware lock state from the locked state to the unlocked state and send a process completion message to the host computing system;

when the unlock request is invalid, send the process completion message to the host computing system without updating the firmware lock state;

receive, from the host computing system, a firmware update request;

determine whether the firmware lock state is in the locked state or the unlocked state;

receive, from the host computing system, a firmware payload;

authenticate data of the firmware payload; and when the firmware lock state is determined to be in the unlocked state, and when the data of the firmware payload is authenticated, install the firmware payload.

10. The USB input device of claim 9, wherein the USB input device comprises a biometric input device.

11. The USB input device of claim 9, wherein the USB input device is further configured to, after determining whether the firmware lock state is in the locked state or the unlocked state, send a response message to the host computing system.

12. The USB input device of claim 9, wherein the USB input device is further configured to, when the firmware lock state is determined to be in the locked state, send, to the host computing system, a response message rejecting the firmware update request.

13. The USB input device of claim 9, wherein the USB input device is configured to determine whether the unlock request is valid or invalid by comparing an identifier of the unlock request to an expected identifier.

14. The USB input device of claim 9, wherein the USB input device is configured to determine whether the unlock request is valid or invalid by decrypting the unlock request and comparing a hash of the unlock request to an expected hash.

15. The USB input device of claim 9, wherein the USB input device is configured to send the process completion message to the host computing system by sending information indicating the firmware lock state with the process completion message.

16. The USB input device of claim 9, wherein the USB input device is configured to authenticate the data of the firmware payload by verifying a hash of the firmware payload.

17. The USB input device of claim 9, wherein the USB input device is configured to, after installing the firmware payload, update the firmware lock state to the locked state.

18. The USB input device of claim 9, wherein the USB input device is connected to a motherboard of a laptop computer via a USB connection.

19. A method for installing firmware on a controller of a USB input device, the method implemented with a host computing system coupled to the USB device for providing firmware thereto, the host computing system executing instructions stored thereon for performing the method, comprising:

sending, to the controller, an unlock request for changing a firmware lock state of the controller from a locked state to an unlocked state;

receiving, from the controller, a process completion message, the completion message resulting from the controller successfully validating the unlock request then unlocking the locked state;

sending, to the controller, a request to install the firmware on the controller;

receiving, from the controller, a message responsive to the request to install the firmware;

sending, to the controller, a firmware payload for installation at the controller;

when validation of the unlock request and a verification of the firmware payload are successful, receiving a confirmation of firmware installation; and when the unlock request is not successful and/or when the verification of the firmware payload is not successful, receiving a message regarding a failure to complete the firmware installation.

20. The method of claim 19, wherein sending the firmware payload comprises sending a signed binary.

* * * * *